Nov. 11, 1924.
A. A. AUSTIN
DEVICE FOR TEACHING CARD GAMES
Filed July 20, 1923  2 Sheets-Sheet 1
1,514,823
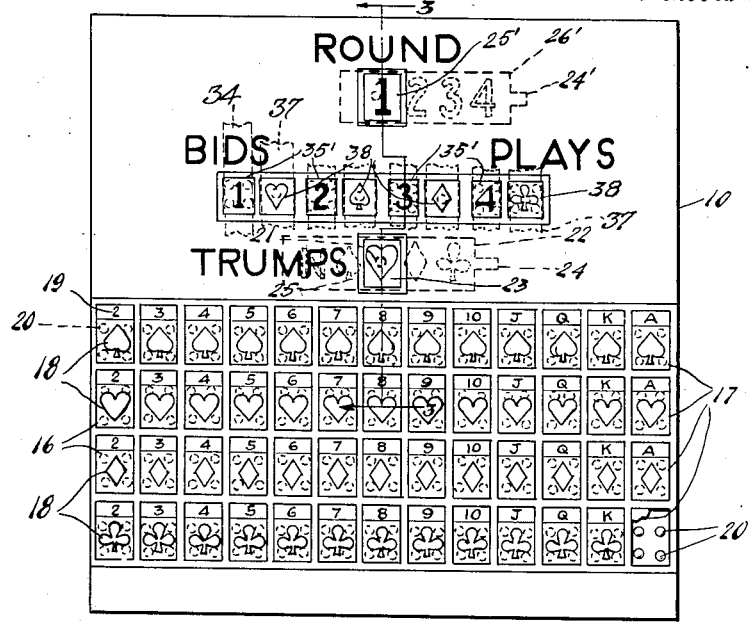
Fig.1
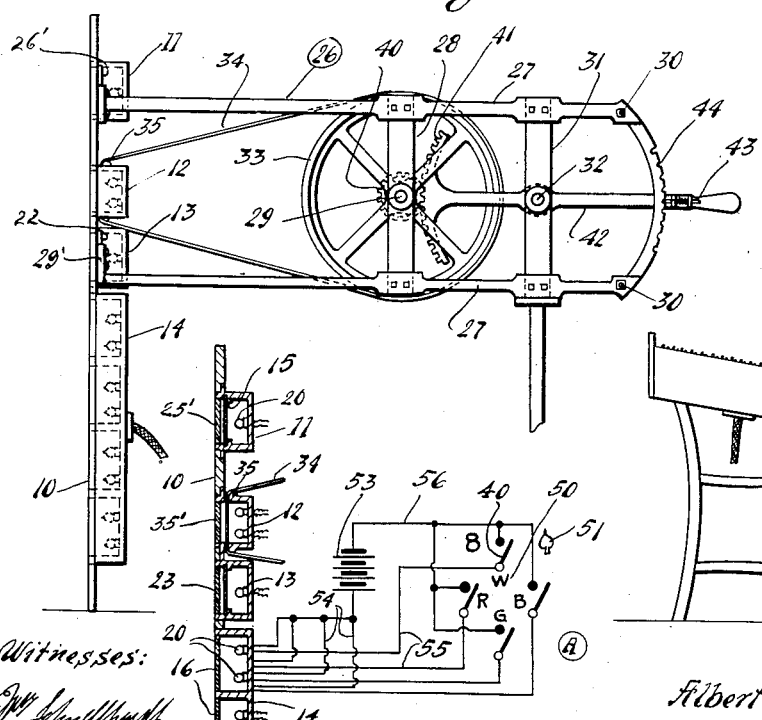
Fig.2
Fig.2a
Fig.3
Witnesses:
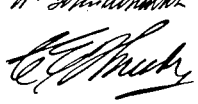
Inventor:
Albert A. Austin
By Joshua R. H. Potts
His Attorney.

Nov. 11, 1924.

A. A. AUSTIN 1,514,823

DEVICE FOR TEACHING CARD GAMES

Filed July 20, 1923   2 Sheets-Sheet 2

Witnesses:

Inventor:
Albert A. Austin
By Joshua R. H. Potts
His Attorney

Patented Nov. 11, 1924.

1,514,823

UNITED STATES PATENT OFFICE.

ALBERT A. AUSTIN, OF CHICAGO, ILLINOIS.

DEVICE FOR TEACHING CARD GAMES.

Application filed July 20, 1923. Serial No. 652,732.

*To all whom it may concern:*

Be it known that I, ALBERT A. AUSTIN, a citizen of the United States, and a resident of the city of Chicago, county of Cook and State of Illinois, have invented certain new and useful Improvements in a Device for Teaching Card Games, of which the following is a specification.

My invention relates to a device for teaching card games. The object of the invention is to direct the student as to what card to play and this is accomplished by producing upon an illuminated board the various plays.

A further object of the invention is to provide an illuminated board having characters displayed thereon, substantially similar to the characters printed or embossed on the cards, which enables the teacher or operator of the board to keep account of the cards dealt and to indicate to each student what card or cards he should play. The arrangement is such that persons who are not familiar with various card games can be readily taught almost any game capable of being played with the ordinary playing cards.

Other objects will appear hereinafter.

The invention consists in the combinations and arrangements of parts hereinafter described and claimed.

The invention will be best understood by reference to the accompanying drawings forming a part of this specification, and in which, Fig. 1, is a front elevational view of the display board embodied in the invention;

Fig. 2, is a side elevational view of the same;

Fig. 2ª, is a side elevational view of the operator's switch board embodied in the invention;

Fig. 3, is a fragmentary sectional view taken substantially on line 3—3 of Fig. 1, showing the preferred circuit arrangement embodied in the invention;

Figure 4:
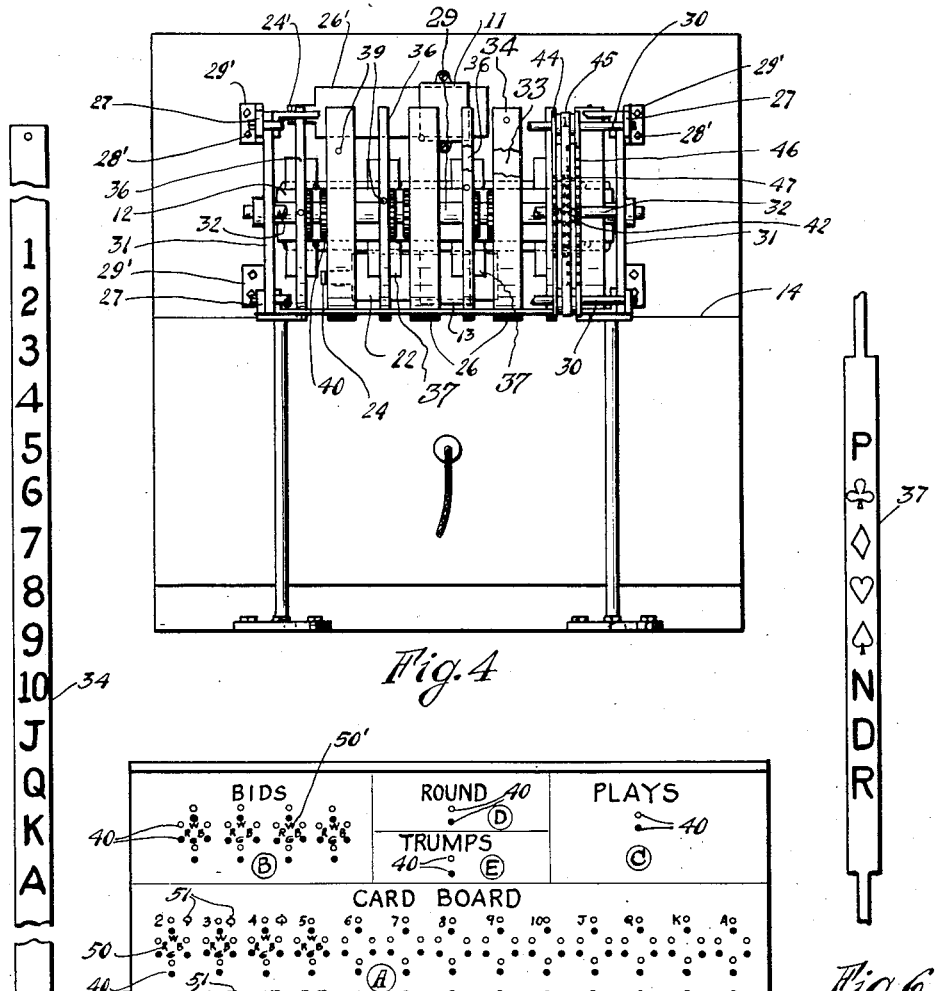
Fig. 4, is a rear view of the display board.

In attaining the objects of the invention and referring to the drawings, the display board is indicated at 10 and is provided with a number of compartments 11, 12, 13 and 14 having open front walls as at 15 with transparent closure members. The compartments 14 are arranged adjacent to each other and in parallel rows as indicated at 17. The closure members 16 of these compartments 14 bear on their outer faces characters 18 substantially similar to the characters printed or embossed on the ordinary playing cards (not shown), such for example the characters representing spades, hearts, diamonds and clubs. At the top of certain of the closure members 16 of the compartments 14 appear numerals indicated at 19 beginning with (2) and ending with (10) and at the top of the other closure members of said compartments appear the letters, J, Q, K and A which represent jack, queen, king and ace of the playing cards. Within the compartments 14 are arranged by suitable means lighting elements indicated at 20, there being four such lighting elements confined in the compartments and of different colors, for example, red, white, blue and green, for reasons to be more fully hereinafter understood. The compartment 13 has confined therein a lighting element indicated at 21 preferably a white lamp. To the rear of the board 10 is arranged a slide 22 adapted to pass to the rear of the closure member 23 of the compartment 13. This slide is manipulated manually and to facilitate manipulation of the slide there is provided a finger gripping portion 24. On the face of the slide adjacent the back of the board appear a representation of a heart, spade, diamond and club and the letter "n" for no trump. On the face of the board adjacent the opening of the compartment 13 is printed or embossed the word "Trumps" and after a fuller description of the operation of the board it will be seen that the characters on the slide 22 indicate what cards are trumps. To the rear of the board 10 and to the rear of the closure 25' of the compartment 11 is a similar slide 26' bearing the numerals (1) to (4) and adapted to be manipulated by grasping a finger gripping portion 24' formed as an integral part of the slide. These numerals represent the number of rounds that have been played. Adjacent the top of the opening of the compartment 11 is printed or embossed the word "Round".

Figures 5, 6, 7:
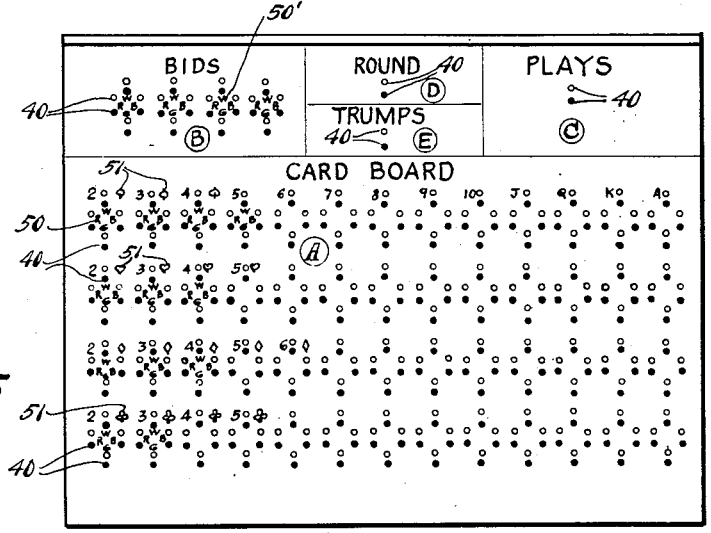
Fig. 5, is a plan view of one of the ribbons bearing characters substantially similar to characters printed or embossed on the ordinary playing cards.
Fig. 6, is a plan view of another of the ribbons embodied in the invention.
Fig. 7, is a plan view of the operator's switch board illustrated in Fig. 2ª.

The board 10 is supported by a frame 26 which includes side frame members 27 carrying a vertically extending support 28 which serves as a bearing for a shaft 29. The side frame members 27 are connected together by tie rods 30, and further carry a support 31 serving as a bearing for a shaft 32. The frame is fixed to the board by suitable bolts indicated at 28' passing through lugs 29' carried by the frame members 27. On the shaft 29 are mounted a number of adjacent pulleys 33 around each of which a ribbon 34 passes. The ribbons 34 extend over bevelled guides 35 through the compartments 12 to the rear of the closure members of the openings thereof. One of these ribbons is illustrated in Fig. 5 and has printed or embossed thereon numerals beginning with (1) and ending with (10) and four letters of the alphabet, namely, J, Q, K and A. These numerals and letters are substantially the same as the numerals and letters appearing on the ordinary playing cards with the exception of the numeral (1) the ace card of a deck of ordinary cards being card 1. When the game is in progress these numerals indicate the amount of the bid. As shown there are four such ribbons which are adapted to pass to the rear of the four of the closure members such for example as indicated at 35'. Adjacent the rollers 33 are other rollers 36 around which ribbons 37 are adapted to pass. One of the ribbons 37 as illustrated in Fig. 6 and there appear on one side thereof characters such for example as letters P, N, D, and R, and a representation of a spade, diamond, heart and club. These ribbons are adapted to pass over bevelled guides similar to that indicated at 35 to the rear of the closure members 38 of the other of said compartments 12. The characters on these ribbons indicate, when visible through the closure members, the nature of the play or bid. Adjacent the top of the compartments 12 at opposite ends thereof are printed or embossed the words "Bids" and "Plays".

The ribbons 34 and 37 are fixed to the pulleys by pin members indicated at 39 to prevent the ribbons from slipping on the pulleys when the same are rotated.

Manipulation of the pulleys is accomplished through the medium of gears 40 forming an integral part of the pulleys and which mesh with adjacent segment gears 41 carried by operating levers 42 pivoted on the shaft 32 and provided with pawls 43 for engagement with ratchets 44, carried by the frame members 27 at the inner extremities thereof. By movement of the lever 32 the pulleys which are free to rotate on the shaft 39 are caused to rotate and operate the ribbons thereon.

In order that the operator of the device may be in a position to know what characters are visible through the openings of the various compartments I provide dials 45 adjacent the ratchets 44 and there appears on these dials numerals 46 and letters 47 substantially similar to the numerals and letters appearing on the ribbons 34 and 37.

In Fig. 2ª there is shown the operator's switch board indicated by reference character 48. There is carried by this switch board a number of switches 40 of the push button type which control the lighting elements within the various compartments.

The group of switches within the space indicated at A is divided into small groups of four switches to a group for controlling the lighting elements of each of the compartments 14. At one side of each of the switches of the group there appears a letter 50 indicating the color of the lamp that that switch controls and in a convenient place there is printed a character, as at 51 substantially similar to the character on the closure member of the compartment within which the elements controlled by these switches are confined. The switches within the space indicated at B are likewise divided in groups of four switches each controlling the lighting element confined in the compartment with the closure members herein indicated at 35'. Adjacent these switches also appear the letters R, W, B, and G as at 50' for reasons above set forth with reference to the letters 50. The switch within the space indicated at C controls the lighting elements confined in the other compartments 12, and those within the spaces indicated at D and E control the lighting elements confined within the compartments 11 and 13 respectively.

The circuit arrangement of one of the smaller groups of switches is best illustrated in Fig. 3 and includes a suitable source of electric supply indicated at 53 connected in circuit by conductors 54 with the lighting elements which in turn are connected by conductor wires 55 with the switches and the switches are connected in circuit with the saurce of supply by conductor wires 56.

The device as herein described and illustrated in the drawings is constructed for use by one skilled in the art of playing cards to teach new players the card game well known by the name of "bridge," however, by slight changes the device can be employed for teaching new players other card games. In the present instance when the cards are dealt out the one dealing the cards informs the switch board operator of the character of the cards that he is dealing and as the cards are dealt the switch board operator illuminates the lighting elements which indicate such cards, these lighting elements being located in the various compartments 14. Each player is assigned a certain color of lighting element and as his light appears in one or more of the compartments 14 it indicates that he is the holder of those cards. This applies also to the other players, the difference being that each player has assigned to him a different color of lighting element. The operator indicates the round by manipulating the slide 26' bringing one of the numerals appearing thereon to the rear of the closure member where the same is visible, for example, if the round is the first round, numeral (1) will appear in the window. One of the players is requested to bid and this bid is recorded on the display board by illuminating the lighting element, through the medium of one of the switches in the smaller groups of group A, the lighting element assigned to the player bidding will be the one that is illuminated, and appear in one of the compartments 12. If the player bids for example two of clubs the lighting element within one of the compartments 12 having the club appearing on its closure member will be illuminated. The trump card is brought into view by manipulating the slide 24 and by illuminating the compartment 13 through the medium of the switch indicated at group E. After the game has progressed thus far the one operating the switch board begins the task of teaching the players how the game is to be played and this is accomplished by turning out the lights of the compartments 14 in the order the cards are to be discarded. For example one of the players is assigned to the red light and he holds the three of hearts and the operator intends to have him play that card, he, the operator, will put out the red light within the compartment having the closure member with the three of hearts appearing thereon. The player taking notice of this will discard the three of hearts. This continues until the first round is completed. The recording of the bids and plays is accomplished by the manipulation of the levers which causes the pulleys to rotate bringing the various numbers and characters of the ribbons to the rear of the window where they are visible to the players.

It will be apparent that I provide a device, by the use of which, new players can be intelligently taught various games of cards played with the playing cards of the ordinary type.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent, is:

1. A device for teaching the method of playing card games including, a display board having a number of compartments with transparent front walls, illuminating means arranged in the compartments, certain of said illuminating means being of different colors, means remote from the display board for controlling the illuminating means, and means adapted to pass through certain of said compartments to the rear of the closure members thereof and having characters appearing thereon to be displayed through the closure members to indicate a certain play of a card game, said characters being substantially the same as characters appearing on the faces of ordinary playing cards.

2. A device for teaching the method of playing card games including, a display board having a number of compartments with transparent front walls, illuminating means arranged in the compartments, certain of said illuminating means being of different colors, means remote from the display board for controlling the illuminating means, means adapted to pass through certain of said compartments to the rear of the closure members thereof and having characters appearing thereon adapted to be displayed through the closure members to indicate a certain play of a card game, said characters being substantially the same as characters appearing on the faces of ordinary playing cards, and means controlling said first named means.

3. A device for teaching the method of playing card games including, a display board having a number of compartments with transparent front walls, illuminating means arranged in the compartments, certain of said illuminating means being of different colors, means remote from the display board for controlling the illuminating means, means adapted to pass through certain of said compartments to the rear of the closure members thereof and having characters appearing thereon adapted to be displayed through the closure members to indicate a certain play of a card game, said characters appearing on the faces of the ordinary playing cards, and members adapted to be mounted to the rear of certain of the other of said compartments and having numerals appearing thereon adapted to be visible through the closure members of said last named certain compartments.

4. A device for teaching the method of playing card games including, a display board having a number of compartments with transparent front walls, illuminating means arranged in the compartments, certain of said illuminating means being of different colors, means remote from the display board for controlling the illuminating means, and means adapted to pass through certain of said compartments to the rear of the closure members thereof and having characters appearing thereon adapted to be displayed through the closure members to indicate a certain play of a card game, said characters being substantially the same as characters appearing on the faces of the ordinary playing cards, members adapted to be mounted to the rear of certain of the other of said compartments and having numerals appearing thereon adapted to be visible through the closure members of said last named certain compartments, and means controlling said first named means.

5. A device for teaching the method of playing card games including, a display board having a number of compartments with transparent front walls, lighting elements arranged in said compartments, there being four of said lighting elements in each of certain of said compartments and of different colors, and a switch board remote from the display board having a number of switches connected in circuit with the lighting elements for controlling said lighting elements.

6. A device for teaching the method of playing card games including, a display board having a plurality of compartments arranged in parallel rows and provided with transparent front walls having various characters of playing cards thereon, lighting elements arranged in the compartments, there being four lighting elements of different colors in each compartment, a row of compartments located above said parallel rows of compartments and having transparent closure members, means back of said closure members to display characters of playing cards, lighting elements within said compartments there being four lighting elements in each of said certain last named compartments, a compartment located above said last named row of compartments and provided with a transparent closure member, a lighting element in said compartment, a compartment located between the parallel rows of compartments and the other row of compartments, a lighting element arranged in said last named compartment, and means remote from said display board for controlling said lighting elements.

7. A device for teaching the method of playing card games including a plurality of compartments having open front walls, lighting elements arranged in said compartments, certain of said lighting elements being of different colors, means for controlling the lighting elements, and means adapted to pass through said compartments to the rear of the openings thereof and having characters appearing thereon adapted to be displayed through the openings to indicate a certain play of a card game.

8. A device for teaching the method of playing card games including a plurality of compartments having open front walls, lighting elements arranged in said compartments, means for controlling said lighting elements, and means adapted to pass through said compartments to the rear of the openings thereof and having characters appearing thereon adapted to be displayed through the openings to indicate a certain play of a card game.

9. A device for teaching the method of playing card games including a plurality of compartments having open front walls, lighting elements arranged in the compartments, and means adapted to pass through said compartments to the rear of the openings thereof and having characters appearing thereon adapted to be displayed through the openings to indicate a certain play of a card game.

10. A device for teaching the method of playing card games including a plurality of compartments having open front walls, lighting elements arranged in the compartments, means adapted to pass through certain of said compartments to the rear of the closure members and having characters appearing thereon to indicate through the closure members a certain play of a card game, and means for manipulating said last named means.

11. A device for teaching the method of playing card games including a plurality of compartments having open front walls, closure members for said openings, lighting elements arranged in the compartments, means adapted to pass through said compartments to the rear of the closure members and having characters appearing thereon adapted to be displayed through the closure members to indicate a certain play of a card game, means for manipulating said last named means, adjacent compartments arranged in parallel rows and having open front walls, closure members for said openings having characters appearing thereon, and illuminating means within said last named compartments.

12. A device for teaching the method of playing card games including compartments having open front walls, closure members having characters appearing thereon for the compartments, illuminating means in said compartments, other compartments having open front walls, closure members for said openings, illuminating means within said latter named compartments, and means adapted to pass through said compartments to the rear of the closure members and having characters appearing thereon adapted to be displayed through the closure members to indicate a certain play of a card game.

13. A device for teaching the method of playing card games including compartments having open front walls, closure members having characters appearing thereon for the compartments, illuminating means in said compartments, other compartments having open front walls, closure members for said openings, illuminating means within said latter named compartments, means adapted to pass through said compartments to the rear of the closure members and having characters appearing thereon adapted to be displayed through the closure members to indicate a certain play of a card game, and means controlling said illuminating means.

14. A device for teaching the method of playing card games including compartments having open front walls, closure members having characters appearing thereon for the compartments, illuminating means in said compartments, other compartments having open front walls, closure members for said openings, illuminating means within said latter named compartments, means controlling said illuminating means, and means for controlling the means adapted to pass over said closure members.

15. A device for teaching the method of playing card games including compartments having open front walls, closure members for the open walls of the compartments having characters appearing thereon, illuminating means arranged in the compartments, said illuminating means being of different colors, other compartments having open front walls, closure members for said open front walls, illuminating means arranged within said other compartments, means adapted to pass through said other compartments to the rear of the closure members thereof, said means having characters appearing thereon adapted to be visible through the closure members of said other compartments, and means for controlling the first mentioned illuminating means, said means including a switch board having a plurality of switch elements thereon with characters adjacent the elements indicating the color of the illuminating means controlled by the switches.

In testimony whereof I have signed my name to this specification in the presence of two subscribing witnesses.

ALBERT A. AUSTIN.

Witnesses:
FREDA C. APPLETON,
JOSHUA R. H. POTTS.